(12) United States Patent
Beck

(10) Patent No.: US 6,568,671 B1
(45) Date of Patent: May 27, 2003

(54) METHOD AND SYSTEM FOR DETERMINING IF A MAILPIECE HAS PROPERLY EXITED FROM A MAILING MACHINE

(75) Inventor: Christian A. Beck, Ridgefield, CT (US)

(73) Assignee: Pitney Bowes Inc., Stamford, CT (US)

( * ) Notice: Subject to any disclaimer, the term of this patent is extended or adjusted under 35 U.S.C. 154(b) by 58 days.

(21) Appl. No.: 10/011,491

(22) Filed: Nov. 13, 2001

(51) Int. Cl.[7] .................................................. B65H 1/18
(52) U.S. Cl. ....................................................... 271/152
(58) Field of Search ................................. 271/152, 176, 271/215, 265.01, 3.13, 110, 227; 209/660; 250/548, 559.4; 162/263; 358/488; 399/371; 700/228, 230

(56) References Cited

U.S. PATENT DOCUMENTS

| | | | | |
|---|---|---|---|---|
| 5,464,317 A | | 11/1995 | Foster et al. ............. | 414/798.2 |
| 6,135,436 A | * | 10/2000 | Hur .................................. | 27/2 |
| 6,250,629 B1 | * | 6/2001 | Brown et al. ................ | 271/220 |
| 6,481,712 B1 | * | 11/2002 | Yap ............................. | 271/303 |

FOREIGN PATENT DOCUMENTS

EP          0 639 523 A1  *  8/1994  ........... B65H/45/18

* cited by examiner

*Primary Examiner*—Donald P. Walsh
*Assistant Examiner*—Kenneth W Bower
(74) *Attorney, Agent, or Firm*—Brian A. Lemm; Angelo N. Chaclas; Charles R. Malandra, Jr.

(57) ABSTRACT

A method and system for determining if envelopes are properly exiting a mailing machine, and if not, halting operation of the mailing machine before a jam occurs inside the mailing machine is provided. A guide member is placed at the output of the mailing machine. The guide member includes a conductive fiber brush that mates with a corresponding conductive brush to complete a conductive circuit that is monitored by a controller in the mailing machine. An envelope exiting the mailing machine will pass between the conductors, thereby opening the conductive circuit. The controller, by monitoring the status of the circuit, determines if an envelope has properly exited the mailing machine. If an envelope has not properly exited the mailing machine, the controller will halt operation of the mailing machine, thereby preventing a jam from occurring in the mailing machine.

29 Claims, 3 Drawing Sheets

METHOD AND SYSTEM FOR DETERMINING IF A MAILPIECE HAS PROPERLY EXITED FROM A MAILING MACHINE

FIELD OF THE INVENTION

The invention disclosed herein relates generally to mailing machines, and more particularly to a method and system for detecting if a mailpiece has properly exited from the mailing machine.

BACKGROUND OF THE INVENTION

Mailing machines often include different modules that automate the processes of producing mailpieces. The typical mailing machine includes a variety of different modules or sub-systems each of which performs a different task on the mailpiece. The mailpiece is conveyed downstream utilizing a transport mechanism, such as rollers or a belt, to each of the modules. Such modules could include, for example, a singulating module, i.e., separating a stack of mailpieces such that the mailpieces are conveyed one at a time along the transport path, a moistening/sealing module, i.e., wetting and closing the glued flap of an envelope, a weighing module, and a metering module, i.e., applying evidence of postage to the mailpiece. The exact configuration of the mailing machine is, of course, particular to the needs of the user. After the operation is complete, the finished mailpiece is ejected from the mailing machine and collected in some type of collection device, such as, for example, a tray or bin.

To further automate the process of mail preparation, drop stackers have been developed to collect and neatly stack the envelopes so that an operator can easily remove the completed envelopes from the drop stacker after processing a batch of envelopes. A drop stacker is generally used in low to medium volume operations. If a large volume of envelopes are being processed, then power stackers employing moving conveyor belts to carry away and collect the envelopes are typically used.

When processing a batch of envelopes, it is desirable to keep the envelopes separated. Specifically, the leading edge of an envelope should not run into the trailing edge of the previous envelope. Otherwise, misfeeds and jams can occur, creating downtime for the mailing machine. Such downtime impacts throughput of the machine, i.e., the number of mailpieces processed per minute, as well as requiring operator intervention to correct. To help prevent such jams, mailing machines are typically provided with internal sensors to detect the position of a mailpiece as it passes through the mailing machine.

The use of stackers, or even bins, to collect the envelopes exiting from the mailing machine can create additional problems with respect to jamming of the envelopes. For example, since there are no sensors in the stacker or bin to provide feedback to the mailing machine, if there is a pile-up or jam of envelopes in the stacker or bin the mailing machine will continue to process the envelopes and attempt to eject them into the stacker. If the envelopes cannot exit the mailing machine due to the jam or pile-up in the stacker or bin, a jam in the mailing machine will eventually occur as well. Thus, instead of having to simply clear the jam or pile-up in the stacker or bin and restart the processing of the mailpieces, the mailing machine must also be shut down and the transport path for the envelopes cleared of a jam. This can add significant downtime to the operation of the mailing machine, significantly decreasing the throughput of the mailing machine. If an envelope does not properly exit the mailing machine due to an external jam or pile-up in a stacker or bin, it would be desirable to determine such non-exit of the envelope and halt operation of the mailing machine before a jam occurs inside the mailing machine.

Thus, there exists a need for a method and system for determining if envelopes are properly exiting a mailing machine, and if not, halting operation of the mailing machine before a jam occurs inside the mailing machine.

SUMMARY OF THE INVENTION

The present invention alleviates the problems associated with the prior art and provides a method and system for determining if envelopes are properly exiting a mailing machine, and if not, halting operation of the mailing machine before a jam occurs inside the mailing machine.

In accordance with the present invention, a guide member is placed at the output, i.e., the envelope exit, of the mailing machine. The guide member includes a conductive fiber brush or pad that mates with a corresponding conductive brush or pad on the transport deck. When the brush or pads of the guide member and the transport deck contact each other, a conductive circuit is completed. The status of the circuit is monitored by a controller in the mailing machine. An envelope exiting the mailing machine will pass between the corresponding conductive brushes or pads, thereby opening the conductive circuit for the period of time the envelope is passing between the conductors. The controller, by monitoring the status of the conductive circuit, i.e., the timing of the circuit opening and closing, will determine if an envelope has properly exited the mailing machine. If the controller determines that an envelope has not properly exited the mailing machine, the controller will halt operation of the mailing machine, thereby preventing a jam from occurring in the mailing machine.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
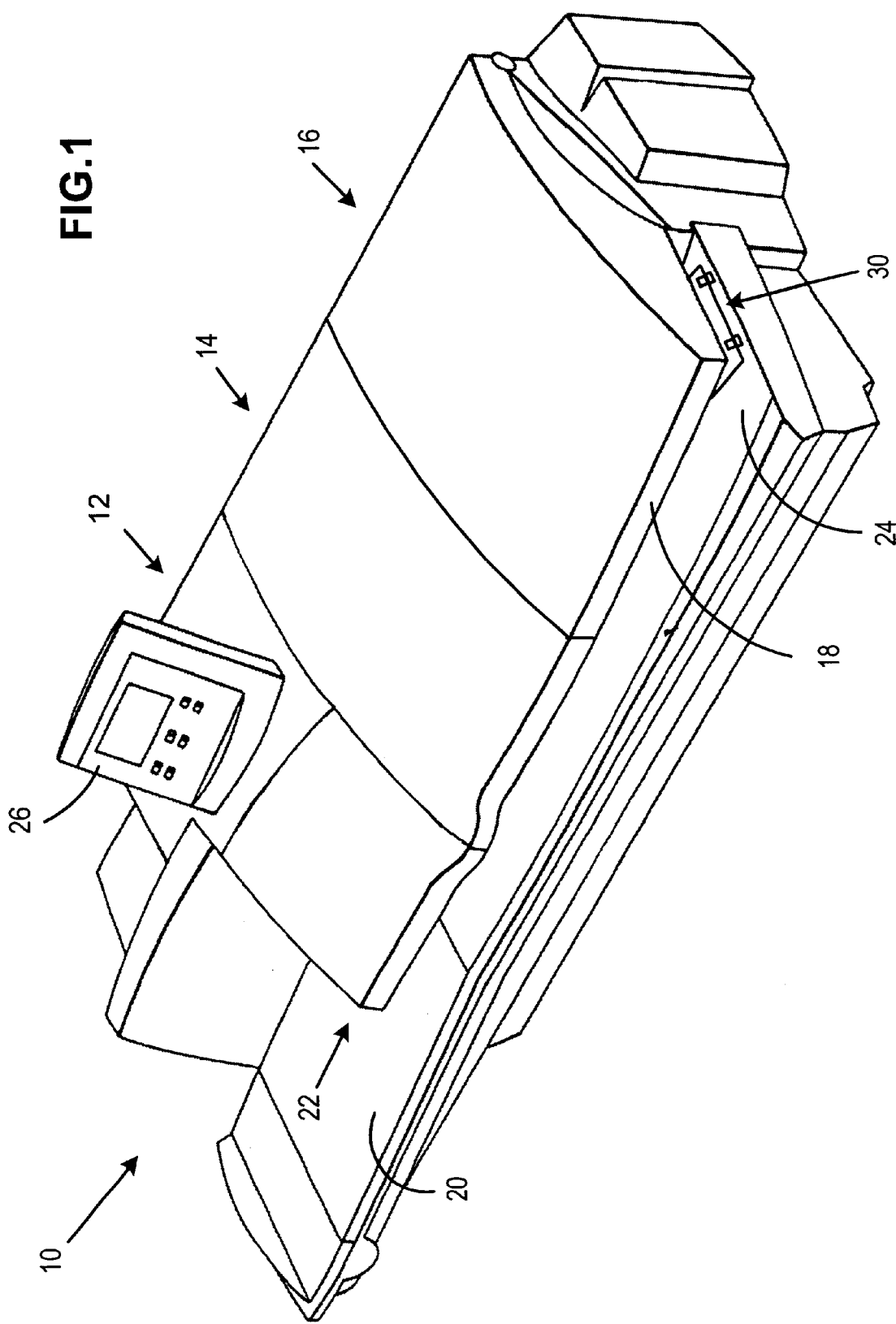
FIG. 1 illustrates an exemplary mailing machine according to the present invention.

In describing the present invention, reference is made to the drawings, wherein there is seen in FIG. 1 a mailing machine 10 according to the present invention. Mailing machine 10 includes one or more modules 12, 14, 16, such as, for example, a singulating module, a moistening/sealing module, a weighing module, and a metering module. Mailpieces are conveyed in the direction of arrow 22 along the transport deck 20. Transport deck 20 is partially covered by cover 18 of each of the modules 12, 14, 16, According to the present invention, a device 30 to determine if envelopes are properly exiting the mailing machine 10 is provided at the exit end 24 of transport deck 20. Mailpieces exiting the mailing machine 10 must pass through the device 30. If device 30 determines that mailpieces are not properly exiting the mailing machine 10, mailing machine 10 will halt operation before a jam occurs further upstream inside the mailing machine 10 as will be described further below.

Figure 2:
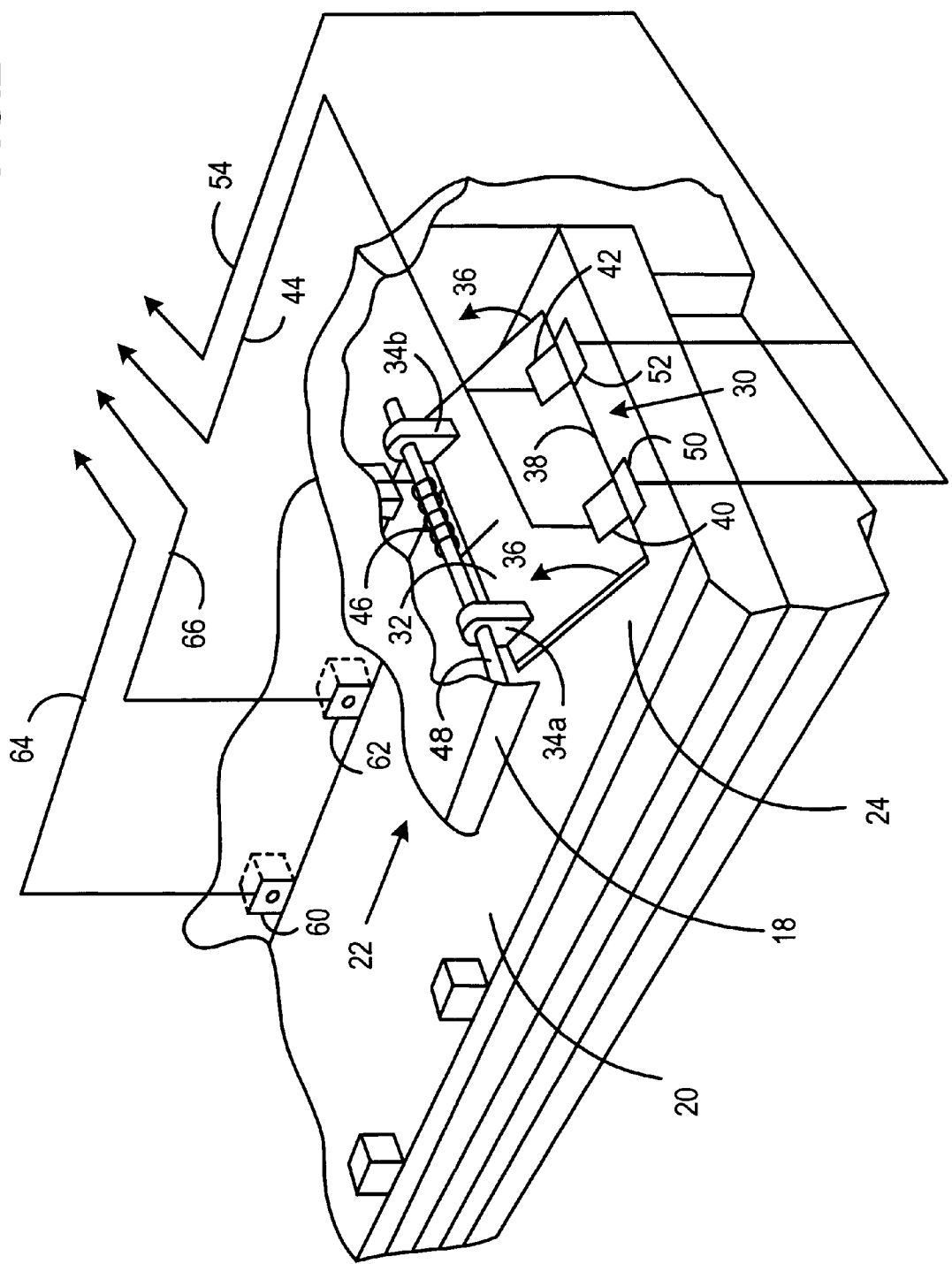
FIG. 2 illustrates a device for determining if a mailpiece has properly exited a mailing machine according to the present invention.

Referring now to FIG. 2, there is shown a detailed view of the exit end 24 of transport deck 20 with portions of the cover 18 removed, thereby exposing device 30. Device 30 includes an elongated guide member 32 that traverses at least a portion of the transport deck 20 such that an envelope passing along transport deck 20 must pass under guide member 32. Guide member 32 is preferably a polymeric material, but can be any type of material that is strong enough to withstand normal use yet light enough to not cause jams during normal operation as will be described below. Guide member 32 is pivotably attached to the cover 18 by shaft 48 and supports 34a, 34b such that guide member 32 can move in the direction indicated by arrows 36. It should be noted, of course, that while two supports 34a, 34b are illustrated in FIG. 2, the invention is not so limited and guide member 32 can be pivotably attached to cover 18 by any means. Shaft 48, or, alternatively, supports 34a, 34b, can be provided with one or more biasing springs 46 to maintain a slight pressure on guide member 32 in the downward direction, i.e., opposite the direction indicated by arrows 36, thereby ensuring contact between the bottom end 38 of guide member 32 and transport deck 20.

Alternatively, guide member 32 can be a flexible material and be fixedly mounted to the cover 18 such that there is contact between the bottom end 38 of guide member 32 and transport deck 20.

Guide member 32 includes a pair of conductive pads or brushes 40, 42 on the bottom end 38. The brushes 40, 42 can be mounted on the guide member 32, or formed integral to the guide member 32. Preferably brushes 40, 42 are spaced apart less than the width of the smallest mailpiece or envelope that mailing machine 10 is designed to handle, thereby assuring that a mailpiece passing under guide member 32 will be wider than the spacing between the brushes 40, 42. A corresponding pair of conductive pads or brushes 50, 52 are provided on the transport deck 20 such that the corresponding pair of brushes 40, 50 and 42, 52 make contact with each other. The brushes 50, 52 can be provided on the top surface of transport deck 20 or alternatively could be integral to the top surface of transport deck 20. It should be understood that while two pairs of corresponding brushes 40, 50 and 42, 52 are illustrated in FIG. 2, the invention is not so limited and any number of corresponding pairs may be used.

Brushes 40, 42 are coupled to a conductive link 44, while brushes 50, 52 are coupled to a conductive link 54. Thus, when brushes 40, 50 and 42, 52 are in contact, a circuit formed by conductive link 44, brushes 40, 42, brushes 50, 52 and conductive link 54 is created. Mailing machine 10 includes a first sensor 60 and a second sensor 62, which provide signals via communication lines 64 and 66, respectively, regarding the relative position of a mailpiece on the transport deck 20. The status of the circuit created by brushes 40, 42, 50, 52 and conductive links 44, 54, along with the signals from the sensors 60, 62, are used to determine if mail is properly exiting the mailing machine 10 as will be described further below.

Figure 3:
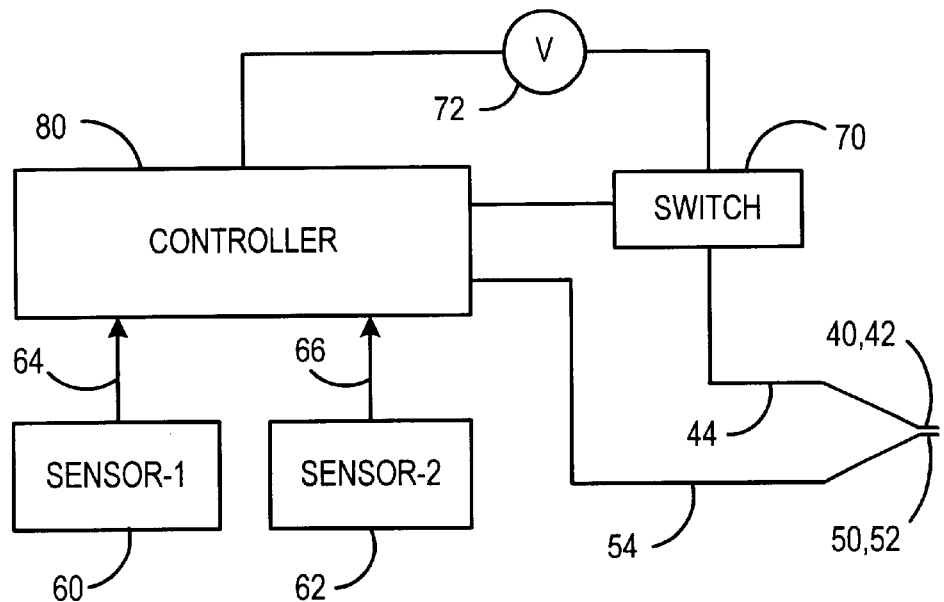
FIG. 3 illustrates in schematic diagram form the circuitry of the device of FIG. 2.

The operation of the device 30 will be described with respect to FIG. 3, which illustrates in schematic diagram form the circuitry of device 30. As shown in FIG. 3, the communication lines 64, 66 are input to a controller 80. Controller 80 is used to control operation of the mailing machine 10. Conductive link 54 is also input to controller 80. Conductive link 44 is coupled to a switch 70. The operation of switch 70 is controlled by controller 80. When controller 80 causes switch 70 to close, a circuit is completed including a voltage source 72, conductive link 44, brushes 40, 42, brushes 50, 52, conductive link 54 and controller 80. Preferably, voltage source 72 is a low voltage source, such as, for example, a 12 Volt supply. It should be noted that while switch 70 and voltage source 72 are illustrated as independent elements from controller 80, the invention is not so limited and one or both of the switch 70 and the voltage source 72 could be integral to controller 80.

A mailpiece traveling on transport deck 20 toward the exit end 24 will pass sensor 60. When the leading edge of the mailpiece passes the sensor 60, a signal is sent to controller 80. As the mailpiece continues to travel to the exit end 24 on the transport deck 20, it will pass the second sensor 62. When the leading edge of the mailpiece passes the sensor 62, a signal is sent to controller 80. Based on the elapsed time between receipt of the signal from sensor 60 and the signal from sensor 62, along with the known rate of travel of the transport deck 20, controller 80 can determine the length of the mailpiece. Also, when the signal from controller 62 is received, controller 80 will activate switch 70, thereby creating a circuit including voltage source 72, conductive link 44, brushes 40, 42, brushes 50, 52, conductive link 54 and controller 80. Alternatively, controller 80 can delay the activation of switch 70 until just before the leading edge of the mailpiece arrives at the brushes 40, 42, 50, 52. Since the distance between the sensor 62 and the brushes 40, 42, 50, 52 is fixed, and the rate of travel of a mailpiece on transport deck 20 is known, the controller 80 can determine the amount of time required for the leading edge of the mailpiece to pass the sensor 62 and arrive at the brushes 40, 42, 50, 52. Accordingly, switch 70 can be activated just prior to the leading edge of the envelope arriving at the brushes 40, 42, 50, 52.

Controller 80 will then monitor the status of the circuit created by activation of switch 70. When the mailpiece exits the mailing machine 10 from the exit end 24 of transport deck 20, it will pass between the guide member 32 and the transport deck 20. Guide member 32, in response to the pressure exerted on it from a mailpiece passing beneath it, will pivot in the direction indicated by arrows 36 (FIG. 2) to allow the mailpiece to pass. Alternatively, if guide member 32 is a flexible member fixedly mounted to the cover 18 of mailing machine 10, the pressure from the mailpiece will cause guide member 32 to flex thereby allowing the mailpiece to pass.

As the mailpiece passes under the bottom end 38 of guide piece 32, the pivoting or flexing of guide member 32 will move the corresponding pairs of brushes 40, 50 and 42, 52 out of contact, thereby opening the circuit created when switch 70 was activated. When the mailpiece has properly exited the mailing machine 10, the guide member 32 will return to its original position, thereby bringing the brushes 40, 42 into contact with brushes 50, 52, respectively, and once again completing the circuit formed by voltage source 72, conductive link 44, brushes 40, 42, brushes 50, 52, conductive link 54 and controller 80.

Controller 80 monitors the status of this circuit, i.e., the timing of the enabling (by activation of switch 70) and disabling (by the mailpiece passing under the guide member 32) of the circuit and, based on the status of the circuit, determines if the mailpiece has properly exited the mailing machine 10.

Figure 4A:
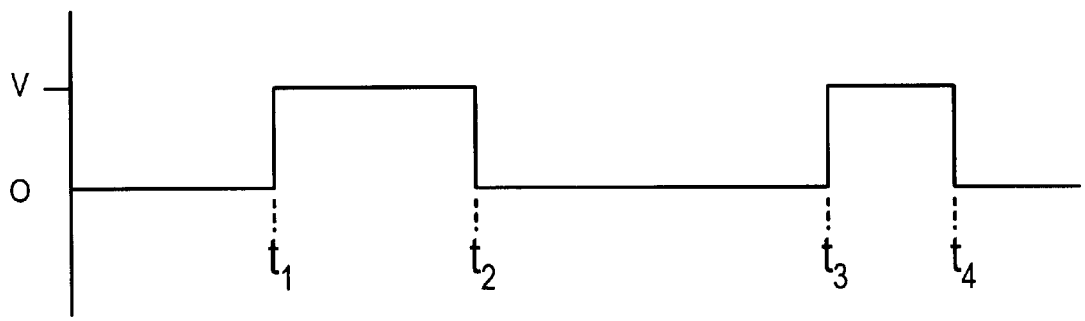
FIGS. 4A and 4B illustrate timing diagrams of operation of the device of FIG. 2.
Figure 4B:
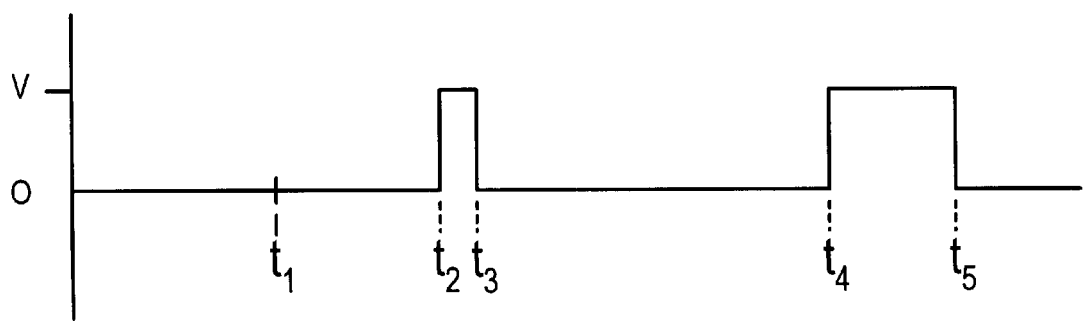

The operation of controller 80 monitoring the status of the circuit is illustrated in the timing diagrams of FIGS. 4A and 4B. Suppose for example, the switch 70 is activated when the controller 80 receives the signal from sensor 62 (indicating the leading edge of a mailpiece has reached sensor 62). As illustrated in FIG. 4A, at time $t_1$ when the leading edge of the mailpiece passes the sensor 62, the signal from sensor 62 will cause controller 80 to activate the switch 70, thereby completing the circuit formed by voltage source 72, conductive link 44, brushes 40, 42, brushes 50, 52, conductive link 54 and controller 80. Thus, the voltage level of the circuit, as monitored by controller 80, will rise from 0 volts to V volts. The circuit will remain enabled for the period of time it takes for the leading edge of the mailpiece to travel along the transport deck 20 from the sensor 62 to the bottom edge 38 of guide member 32. When the leading edge of the mailpiece reaches the bottom edge 38 of the guide member 32 and the brushes 40, 50 and 42,52 are separated by the mailpiece passing under the bottom edge 38 of guide member 32 at time $t_2$, the circuit will be disabled. As the mailpiece passes under the guide member 38, the circuit will remain disabled. When the trailing edge of the mailpiece passes under the bottom edge 38 of guide member 32 at time $t_3$, the brushes 40, 50 and 42, 52 will again make contact, thereby enabling the circuit. At time $t_4$, controller 80 will deactivate switch 70, thereby disabling the circuit, and wait for the leading edge of the next mailpiece to pass sensor 62 upon which the cycle will start again.

As previously noted, the distance between the sensor 62 and bottom edge 38 of guide member 32 is fixed, and accordingly the time required for a mailpiece to travel between them at a given travel rate will be known. Thus, the time between $t_1$ and $t_2$ will be known by controller 80. Also, since the length of the mailpiece is known by controller 80 (derived from the signals from sensors 60 and 62), the time between $t_2$ and $t_3$ will also be known by controller 80. Thus, if the circuit stays enabled longer than the expected time between $t_1$ and $t_2$, controller 80 will halt operation of the mailing machine 10. Such extra time could be caused, for example, by a jam or pile-up at the exit end 24 of the transport deck 20 that prevents the mailpiece from properly traveling from the sensor 62 to the guide member 32. Controller 80 can provide a signal or message related to the possible jam area via display unit 26 (FIG. 1).

Additionally, if the circuit stays disabled longer than the expected time between $t_2$ and $t_3$, controller 80 will halt operation of the mailing machine 10. Such extra time could be caused, for example, by an external jam or pile-up at the exit end 24 of the transport deck 20 that prevents the mailpiece from properly exiting the mailing machine 10 and remain caught between the bottom edge 38 of guide member 32 and the transport deck 20. Controller 80 can provide a signal or message related to the possible jam area via display unit 26 (FIG. 1).

Now suppose for example, controller 80 delays the activation of switch 70 until just before the leading edge of the mailpiece arrives at the brushes 40, 42, 50, 52. As illustrated in FIG. 4B, the leading edge of the mailpiece passes the sensor 62 at time $t_1$. At time $t_2$, after the delay for the leading edge of the mailpiece to travel from the sensor 62 to just before the bottom edge 38 of guide member 32, the controller 80 activates the switch 70, thereby completing the circuit formed by voltage source 72, conductive link 44, brushes 40, 42, brushes 50, 52, conductive link 54 and controller 80. Thus, the voltage level of the circuit, as monitored by controller 80, will rise from 0 volts to V volts. The circuit will remain enabled until time $t_3$ when the leading edge of the mailpiece reaches the bottom edge 38 of the guide member 32 and the brushes 40, 50 and 42, 52 are separated by the mailpiece passing therethrough. As the mailpiece passes under the guide member 38, the circuit will remain disabled. When the trailing edge of the mailpiece passes under the bottom edge 38 of guide member 32 at time $t_4$, the brushes 40, 50 and 42, 52 will again make contact, thereby enabling the circuit. At time $t_5$, controller 80 will deactivate switch 70, thereby disabling the circuit, and wait for the leading edge of the next mailpiece to pass sensor 62 upon which the cycle will start again.

Controller 80 will monitor the status of the circuit to ensure the timing pattern is as expected. Since the circuit is enabled at time $t_2$ just before the mailpiece is expected to arrive at the bottom edge 38 of guide member 32, the time between $t_2$ and $t_3$ will be very short, in the order of milliseconds. Thus, if the circuit is not disabled within the expected time, i.e., at time $t_3$, controller 80 will halt operation of the mailing machine 10. Such disabling could be prevented, for example, by a jam or pile-up at the exit end 24 of the transport deck 20 that prevents the mailpiece from properly traveling from the sensor 62 to the guide member 32. Controller 80 can provide a signal or message related to the possible jam area via display unit 26 (FIG. 1).

Additionally, if the circuit stays disabled longer than the expected time between $t_3$ and $t_4$, controller 80 will halt operation of the mailing machine 10. Such extra time could be caused, for example, by an external jam or pile-up at the exit end 24 of the transport deck 20 that prevents the mailpiece from properly exiting the mailing machine 10 and remain caught between the bottom edge 38 of guide member 32 and the transport deck 20. Controller 80 can provide a signal or message related to the possible jam area via display unit 26 (FIG. 1).

Thus, according to the present invention, if a mailpiece has not properly exited the mailing machine 10, device 30 will cause controller 80 to halt operation of the mailing machine 10. By halting operation of the mailing machine 10 as soon as a mailpiece is prevented from properly exiting the mailing machine 10, such as, for example, by a jam or pile-up in a stacker or bin, the system of the present invention can prevent jams from backing up further into the mailing machine 10. By preventing a jam from backing up into the mailing machine 10, the time necessary to clear the jam can be reduced, thereby increasing the throughput of the mailing machine 10.

It should be understood that although the present invention was described with respect to mailing machines, the present invention is not so limited and is applicable to any type of document preparation system in which prepared articles exit the system in a seriatim manner, such as, for example, pieces of paper exiting printers or copy machines. While a preferred embodiment of the invention has been described and illustrated above, it should be understood that this is exemplary of the invention and is not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A mailing machine comprising:
   a controller to control operation of said mailing machine;
   a transport deck to transport mailpieces through said mailing machine, said transport deck including a first conductor at an exit end of said mailing machine; and a guide member including a second conductor, said guide member traversing at least a portion of said transport deck near said exit end of said mailing machine, said second conductor aligning with said first conductor, said first and second conductors closing a portion of a circuit when making contact, wherein a mailpiece exiting from said mailing machine passes between said guide member and said transport deck, thereby separating said first and second conductors and opening said circuit, and said controller monitors said closing and opening of said circuit to determine if said mailpiece has exited from said mailing machine.

2. The mailing machine according to claim 1, wherein said guide member is pivotably mounted to said mailing machine and said mailpiece exiting from said mailing machine causes said guide member to pivot, thereby separating said first and second conductors.

3. The mailing machine according to claim 1, wherein said guide member is formed from a flexible material that is fixedly mounted to said mailing machine, and said mailpiece exiting from said mailing machine causes said guide member to flex, thereby separating said first and second conductors.

4. The mailing machine according to claim 1, wherein at least one of said first and second conductors is a conductive brush.

5. The mailing machine according to claim 1, wherein at least one of said first and second conductors is a conductive pad.

6. The mailing machine according to claim 1, wherein said second conductor is mounted on said guide member.

7. The mailing machine according to claim 1, wherein a portion of said second conductor is integral to said guide member.

8. The mailing machine according to claim 1, wherein said first conductor includes a plurality of conductors.

9. The mailing machine according to claim 8, wherein said second conductor includes a plurality of conductors that correspond to said plurality of conductors of said first conductor.

10. The mailing machine according to claim 1, wherein said mailpiece exiting from said mailing machine passes between said first and second conductors, thereby separating said first and second conductors and opening said circuit.

11. The mailing machine according to claim 1, further comprising:
a switch coupled in said circuit, said switch being controlled by said controller; and
a sensor located along said transport deck before said guide member, said sensor providing a signal to said controller when a mailpiece is detected,
wherein said controller, in response to receiving said signal from said sensor, activates said switch thereby completing said circuit.

12. The mailing machine according to claim 11, wherein said controller delays a predetermined amount of time before activating said switch after receiving said signal from said sensor.

13. A device for determining if an article has exited from a machine, said machine including a transport path moving said article through said machine and a controller for controlling operation of said machine, said device comprising:
a guide member including a first conductor, said guide member traversing at least a portion of said transport path near an exit end of said machine, said first conductor aligning with a second conductor located on said transport path, said first and second conductors closing a portion of a circuit when making contact,
wherein an article exiting from said machine passes between said guide member and said transport path, thereby separating said first and second conductor and opening said circuit, and said controller monitors said closing and opening of said circuit to determine if said article has exited from said machine.

14. The device according to claim 13, wherein said guide member is pivotably mounted to said machine and said article exiting from said machine causes said guide member to pivot, thereby separating said first and second conductors.

15. The device according to claim 13, wherein at least one of said first and second conductors is a conductive brush.

16. The device according to claim 13, wherein at least one of said first and second conductors is a conductive pad.

17. The device according to claim 13, wherein said article exiting from said machine passes between said first and second conductors, thereby separating said first and second conductors and opening said circuit.

18. The device according to claim 13, further comprising:
a switch coupled in said circuit, said switch being controlled by said controller; and
a sensor located along said transport path before said guide member, said sensor providing a signal to said controller when an article is detected,
wherein said controller, in response to receiving said signal from said sensor, activates said switch thereby completing said circuit.

19. The device according to claim 18, wherein said controller delays a predetermined amount of time before activating said switch after receiving said signal from said sensor.

20. The device according to claim 13, wherein said machine is a mailing machine and said article is a mailpiece.

21. The device according to claim 13, wherein said machine is a printer and said article is a piece of paper.

22. The device according to claim 13, wherein said machine is a copier and said article is a piece of paper.

23. A method for determining if a mailpiece has exited from a mailing machine, said mailing machine including a controller to control operation of said mailing machine and a transport deck for transporting said mailpiece through said mailing machine, said method comprising the steps of:
traversing at least a portion of said transport deck near an exit end of said mailing machine with a guide member, said guide member including a first conductor;
contacting said first conductor with a second conductor on said transport deck, said first and second conductors closing a portion of a circuit when making contact,
passing a mailpiece between said guide member and said transport deck as said mailpiece exits from said mailing machine;
separating said first and second conductors and opening said circuit when said mailpiece passes between said guide member and said transport deck;
contacting said first and second conductors and closing said circuit when said mailpiece has exited said mailing machine; and
monitoring, with said controller, said closing and opening of said circuit to determine if said mailpiece has exited from said mailing machine.

24. The method according to claim 23, wherein if said controller determines said mailpiece has not exited said mailing machine, said method further comprises:

halting operation of said mailing machine.

25. The method according to claim 23, wherein said step of separating said first and second conductors further comprises:

pivoting said guide member away from said transport deck in response to said mailpiece passing between said guide member and said transport deck, thereby separating said first and second conductors.

26. The method according to claim 23, wherein before said step of passing said mailpiece between said guide member and said transport deck, said method further comprises:

sensing said mailpiece approaching said guide member; and activating a switch to apply a voltage to said circuit.

27. The method according to claim 26, wherein said step of activating further comprises:

delaying for a predetermined amount of time before activating said switch.

28. The method according to claim 23, wherein said step of passing further comprises:

passing said mailpiece between said first and second conductors, thereby separating said first and second conductors.

29. The method according to claim 23, wherein said step of monitoring further comprises:

determining a length of said mailpiece;

determining an amount of time said circuit should be open by separating said first and second conductors as said mailpiece passes between said guide member and said transport deck based on said determined length of said mailpiece; and comparing an actual time said circuit is open to said determined time said circuit should be open.

* * * * *